Feb. 14, 1933.  E. P. SEGHERS  1,897,151

TRAP

Filed Feb. 21, 1927

Inventor
Emiel P. Seghers
By Nissen & Craid
attys.

Patented Feb. 14, 1933

1,897,151

UNITED STATES PATENT OFFICE

EMIEL P. SEGHERS, OF CHICAGO, ILLINOIS

TRAP

Application filed February 21, 1927. Serial No. 169,750.

My invention relates to a trap for catching animals such as rats, mice and other rodents, and has for one of its objects the provision of a trap which may be conveniently and safely set without endangering the hands of the operator.

A further object is to provide a safety catch for the trap which will prevent the trap from closing when accidentally released.

A further object is to provide a trigger mechanism for the trap which will automatically regulate the sensitiveness of the trigger.

A further object is to provide a trap which shall be of simple construction and operation.

Other objects will appear from the following description.

The invention is exemplified in the combination and arrangement of parts shown in the accompanying drawing and described in the following specification and it is more particularly pointed out in the appended claims.

In the drawing—

Figures 1, 2, 3, 4, 5, 6:
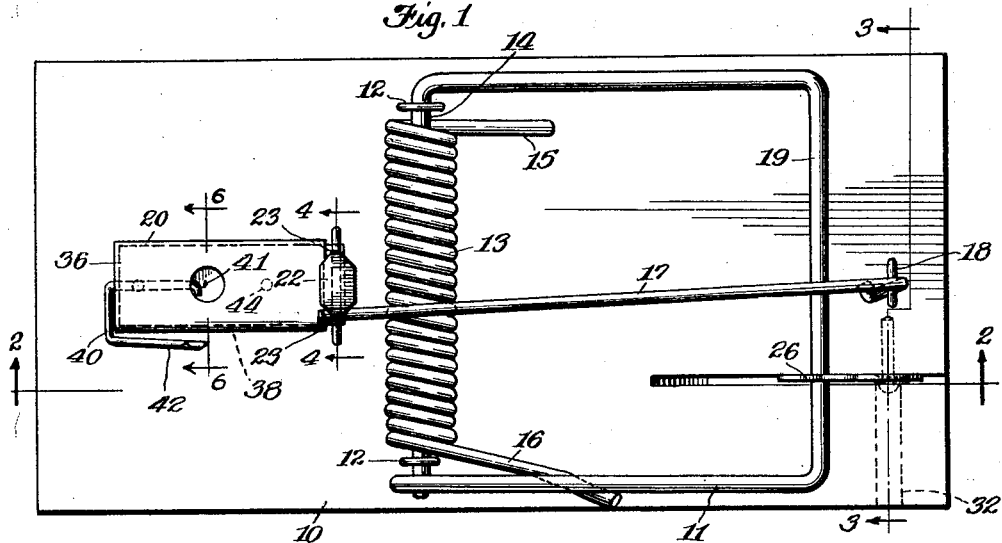
Fig. 1 is a plan view of a trap embodying one form of the present invention, the trap being shown in set position.
Fig. 2 is a section substantially on line 2—2 of Fig. 1.
Fig. 3 is a section substantially on line 3—3 of Fig. 1.
Fig. 4 is a section substantially on line 4—4 of Fig. 1.
Fig. 5 is a perspective view illustrating one position which may be taken by the retainer bar when the trap is being set.
Fig. 6 is a section substantially on line 6—6 of Fig. 1.

In the embodiment of the invention illustrated, the numeral 10 designates a base block which is preferably made of wood. A fall or jaw 11 is pivotally held to the base block by staples 12. A spring 13 surrounds the pivot bar 14 of the jaw 11, one end 15 of the spring being on the base block 10 while the other end 16 engages the jaw 11 to close the jaw in a manner well known in the art. A retainer bar 17 is looped about a staple 18 in position to extend across the cross bar 19 of the jaw 11 and hold the jaw in open position. A trigger 20 is pivoted on a staple 21 and is provided with a detent 22 for holding the retainer bar 17. The detent 22 comprises a horizontally disposed plate provided with projecting points 23 at each end thereof which engage the end of the retainer bar 17, as shown in Figs. 1, 2 and 4. The plate 22 is connected to the trigger 20 by a gooseneck 24 extending upwardly from the trigger 20 and bent forwardly so that the points 23 will be disposed slightly in front of the staple 21 when the trigger 20 is in its lowermost position resting on the upper face of the block 10. The retainer bar 17 is curved to provide an inclined cam face 25 at its forward end. When the trap is being set, the end of the portion 25 is inserted beneath either one or the other of the points 23 and permitted to rise under the force of the jaw 11. As the end of the retainer bar 17 is lifted, the point 23 will slide rearwardly over the inclined end 25, rotating the trigger 20 in a clockwise direction about the staple 21, as viewed in Fig. 2, to raise the trigger into its set position, shown in Fig. 2. This arrangement makes it unnecessary for the operator to place his fingers in front of the pivot bar 14 or to touch the trigger 20 in any way during the setting operation. The jaw 11 may be held open and the retainer bar 17 manipulated from the end of the trap opposite the trigger 20 so that in case of accidental springing of the trap, the operator's fingers will not be in position to be caught. It is only necessary to press the end of the retainer bar downwardly and swing it laterally beneath one of the points 23 and the trigger 20 will be lifted and the trap automatically set. The trigger will be lifted whether the end of the retainer bar is moved laterally against the point 23 or placed below the point and then raised. In either case, the inclined faces of the point 23 and the bent portion of the end of the retainer bar co-operate to bring the parts into set position.

It will be noted that the edges of the points 23 are tapered so that, as the curved portion of the retainer 17 is raised, it will be forced outwardly toward the tips of the points 23. The points 23 are bent downwardly a slight amount, as shown in Fig. 4, and when the end of the retainer bar 17 reaches its limited position, it will be in contact with the tip of the point 23 only, as shown in Fig. 4. In this way, the parts are automatically moved to a position in which the trigger is easily sprung either up or down. Since the retainer bar 17 will be moved outwardly to the same position at all times and does not depend upon the hand adjustment of the operator, the trap will always be set to be sprung with the same degree of ease. The parts may be proportioned to give any degree of sensitivity desired by changing the curvature of the end portion of the retainer 17 and the angle of the edges of the detent 22. When the trigger is moved up or down, the inclined edges of the points 23 will wedge the point of the retainer bar outwardly and dislodge the retainer bar from its detent 22. If the downward curvature of the points 23 is made greater, the sensitivity of the trigger will be decreased, and if the downward curvature of the points is made less, the trap will be made more sensitive. The same effect may be secured by changing the contour of the upper portion of the end of the retainer bar 17.

To further guard the operator against injury by accidental release of the jaw 11, a safety catch 26 is pivoted at 27 in a slot 28 in the base block 10 and is provided with a hook 29 which may be swung over the cross bar 19 of the fall 11 in position to intercept the bar 19 and prevent accidental closing of the jaw. The safety catch 26 may be made of sheet metal, as illustrated, and is preferably provided with a boss 30 surrounding the pivot 27 and arranged to bear against the side of the slot 28 to frictionally hold the safety catch in various positions of adjustment about the pivot 27. The pivot 27 may be in the form of a screw extending through the catch 26 and entering the body of the block 10 in the manner illustrated in Fig. 3. The slot 28 preferably extends only partially through the block 10, leaving a web 31 at the lower edge of the slot and connecting the opposite faces thereof. This web prevents the slot from opening and closing in case the block should swell or warp from exposure to moisture so that the frictional contact between the safety catch 26 and the sides of the slot 28 will be substantially constant. If the parts should become worn or if, for any other reason, the friction on the safety catch becomes insufficient to retain the catch in its positions of adjustment, the screw 27 may be tightened by inserting a screw driver through the opening 32 extending inwardly from the edge of the block 10. The safety catch 26 is preferably provided with a finger-piece 33 on its rear edge by means of which the catch may be drawn backwardly away from operative position. The slot 28 extends a sufficient distance along the block 10 to permit the safety catch to be folded into the slot so that it will not project upwardly a sufficient distance to interfere with packing the trap for shipping. Different positions of adjustment of the catch 26 are illustrated in broken lines in Fig. 2.

In operation, the safety catch 26 is drawn backwardly into the broken line position shown in Fig. 2, in the rear of the path of the bar 19. The jaw is then opened and the safety catch swung into the position shown in full lines in Fig. 2. The retainer bar 17 is then brought into engagement with the trigger 20 to hold the jaw in its set position. It will be apparent that even though the jaw should accidentally be released during the setting operation, it cannot close because of the safety catch 26. After the trap has been set and placed upon the floor or other point infested by rodents, the safety catch is withdrawn so that the jaw is free to close.

In traps of this kind, difficulty has heretofore been experienced from the fact that the retainer bar 17 may be left beneath the jaw 11 when the latter is opened and cannot be withdrawn without releasing the jaw. In attempting to withdraw the retainer bar from beneath the open jaw, the jaw may be accidentally released and injury incurred. This difficulty arises only when the retainer bar is left in a particular position with the loop of the bar extending about the leg of the staple 18 farthest from the edge of the trap from which the end of the retainer bar projects. When the retainer bar is in this position and it is attempted to swing the end of the retainer bar backwardly from beneath the jaw, the loops of the retainer bar and staple will lock in a manner illustrated in Fig. 5 so that if the loops are made in the ordinary way, the retainer bar cannot be drawn backwardly a sufficient distance to clear the jaw. To avoid this difficulty, I have provided an offset in one leg of the loop of the retainer bar, as illustrated at 35. This offset permits the upper portion of the loop formed on the retainer bar to be swung backwardly a sufficient distance to bring the retainer bar in the rear of the jaws so that it may be lifted and swung across the bar 19.

The trigger 20 carries a wooden block 36 on its upper face, the block being provided with flanges 37 having their inner faces dovetailed to receive the metal plate 38 forming the body of the trigger 20. The block 36 may be slid endwise onto the plate 38 for the purpose of facilitating assembling the parts. An opening 39 in the block 36 may be used for inserting bait.

A supplemental bait holder is attached to the trigger and comprises a U-shaped wire 40 having one end thereof disposed in a groove 41 in the lower edge of the block 36 and having the other leg 42 arranged to rotate about the groove 41 as an axis from the position shown in Fig. 1 to the position shown in Fig. 2. The leg 42 is sharpened so that a piece of bait may be hooked either beneath the leg or penetrated thereby. This will hold the bait in place so that the trap will be thrown whether the animal lifts on the bait or depresses it. The leg 42 may be turned into the position shown in Fig. 1 so that the pointed end of the hook will not be exposed. This is desirable for preventing persons from injuring their fingers on the hook when the trap is on display for sales purposes. The pivotal supporting leg of the wire 40 is bent laterally, as shown at 43, in position to rest on the upper face of the metal plate 38 so that the leg 42 will not drop downwardly when the trigger is raised, even though the part 42 is not used for engaging the bait.

It will be understood that various changes in structural features of the invention may be made without departing from the spirit and scope thereof.

The plate 38 is provided with a perforation 44 through which a tack or other fastener may be inserted to hold the block 36 in place on the plate 38.

I claim:—

1. A trap comprising a base member, a jaw mounted on said base member, trigger mechanism for holding said jaw in set position, said base member having a slot therein, a web spanning said slot, a safety catch of less width than said slot pivotally mounted in said slot, means on said safety catch for frictionally engaging the wall of said slot, and a screw for tightening the pivotal mounting for said safety catch.

2. A trap comprising a jaw, a retainer for said jaw, and a pivotally mounted trigger for said retainer, said trigger having laterally projecting V-shaped points for engagement by the end portion of said retainer from either side of the trap to set the latter.

3. A trap comprising a jaw, a retainer for said jaw, said retainer having a U-shaped end portion to form a cam surface, a trigger for said retainer, said trigger having a device for engaging said cam surface to release said retainer when said trigger is operated, said device comprising an outwardly and downwardly extending projection adapted to extend over said U-shaped portion intermediate its ends.

4. A trap comprising a base member, a jaw mounted on said base member, a trigger mechanism for holding said jaw in set position, a safety catch in a slot wider than the thickness of said safety catch, means for pivotally holding said safety catch in said slot, and a bulging extension on said safety catch at the pivot thereof for frictionally engaging one of the walls of said slot to hold the safety catch by friction in adjusted position.

5. A trap comprising a base member, a jaw mounted on said base member, trigger mechanism for holding said jaw in set position, a safety catch for preventing accidental closing of said jaw, an integral lateral bulging projection on said safety catch, and an accessible screw serving as a pivot for said safety catch and as an adjustment of the frictional engagement of said bulging projection with one wall of said slot.

6. A trap comprising a base member, a jaw mounted on said base member, trigger mechanism comprising a retainer for holding said jaw in set position, a safety catch for preventing accidental closing of said jaw, said safety catch being mounted in a slot in said base member, and an accessible headed member serving as a pivot for said safety catch and as a means of adjusting the frictional engagement between said safety catch and one wall of said slot by moving the head on said headed member against said safety catch to hold said safety catch in frictional engagement with said base member.

7. A trap comprising a base member, a jaw mounted on said base member, a trigger mechanism for holding said jaw in set position, said base member having a slot therein, a web spanning said slot, a safety catch of less width than said slot pivotally mounted in said slot, and means on said safety catch for frictionally resisting movement of said safety catch about its pivot.

8. A trap comprising a base member, a jaw mounted on said base member, a trigger mechanism for holding said jaw in set position, said base member having a slot therein, a web spanning said slot, a safety catch tightly held and movably mounted in said slot to resist movement of said safety catch in said slot.

9. A trap comprising a base member, a jaw mounted on said base member, a trigger mechanism for holding said jaw in set position, said base member having a slot therein, a web spanning said slot, a safety catch of greater thickness than said slot pivotally mounted in said slot to resist movement of said safety catch in said slot.

10. A trap comprising a base member, a jaw mounted on said base member, a trigger mechanism for holding said jaw in set position, said base member having a slot therein, a web spanning said slot, a safety catch pivotally mounted in said slot for frictionally engaging said web to resist movement of said safety catch in said slot.

In testimony whereof I have signed my name to this specification on this 18th day of February, A. D. 1927.

EMIEL P. SEGHERS.